Oct. 9, 1956
A. E. YOUNG
2,766,413
POSITION-SENSITIVE PROBE CIRCUIT
Filed Feb. 10, 1954
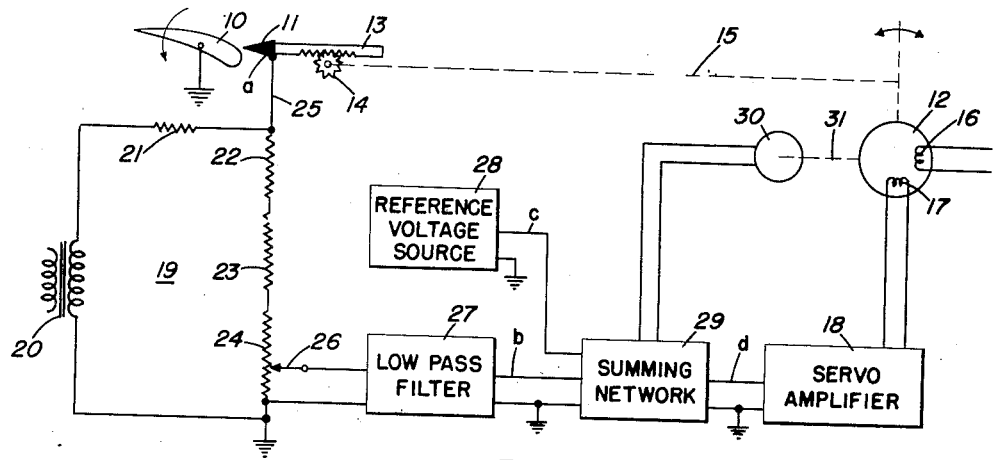
FIG. 1
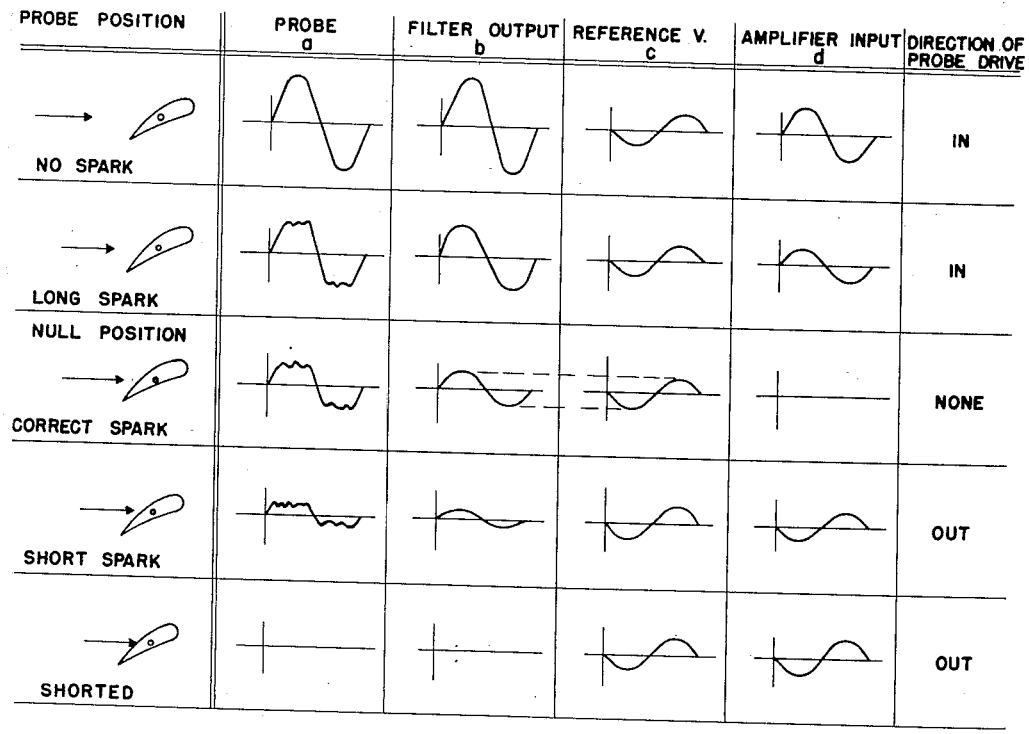
FIG. 2
INVENTOR
ALLEN E. YOUNG
BY 
ATTORNEYS

United States Patent Office 2,766,413
Patented Oct. 9, 1956

2,766,413

POSITION-SENSITIVE PROBE CIRCUIT

Allen E. Young, Fairview Park, Ohio, assignor to the United States of America as represented by the Secretary of the Navy Application February 10, 1954, Serial No. 409,543

3 Claims. (Cl. 318—31)

(Granted under Title 35, U. S. Code (1952), sec. 266)

The invention described herein may be manufactured and used by or for the Government of the United States of America for governmental purposes without the payment of any royalties thereon or therefor.

This invention relates to a position sensitive probe circuit for maintaining a follower probe in a predetermined position with respect to a rotating template.

Generally, the purpose of this invention is to provide a probe which will automatically follow a metallic surface without touching it; and which may be used with any conventional servo amplifier and two phase motor to form a closed loop positioning system.

It is an object of this invention to provide a position sensitive probe circuit including a probe and rotating template in parallel with a resistive circuit, whereby the voltage across said resistive circuit is a function of the length of the gap between said template and said probe.

Another object of this invention is the provision of a position sensitive probe circuit wherein a voltage having a given phase and a magnitude dependent of the distance of said probe from a rotating template is compared with a reference voltage of predetermined magnitude and opposite phase, and wherein the difference between said voltages is used to control a motor to position said probe with respect to said rotating template.

Other and more specific objects and advantages of this invention will become apparent upon a careful analysis of the following specification and the appended claims taken in connection with the accompanying drawing in which:

Fig. 1 is a schematic circuit diagram of a preferred embodiment of this invention; and Fig. 2 is a series of curves representing voltages developed in various parts of the circuit of Fig. 1.

Referring to the drawing, the numeral 10 represents a rotating template, the size and contour of which are designed to produce a given lateral movement of a position sensitive probe 11. The template 10 is composed of a conductive metal and is grounded in any convenient manner. The position sensitive probe 11 is constructed of an insulating material and is mechanically coupled to a reversible two phase motor 12 through a rack 13, a pinion 14 and a shaft 15.

The motor 12 is provided with a pair of field windings 16 and 17 spaced 90 degrees out of phase. The winding 16 is energized by a source of substantially constant alternating voltage (not shown), while the winding 17 is energized by the output of a servo amplifier 18. Depending on the phase and magnitude of the output from the amplifier 18, the direction and speed of rotation of the motor 12 is controlled.

Since it is desired to maintain the probe 11 at a predetermined distance from the rotating template 10, a circuit 19 has been provided for producing a signal voltage which is a function of the distance between said probe and template.

The circuit 19 comprises transformer 20 or any other suitable source of substantially constant alternating voltage in series with a resistor 21, connected across a voltage divider network consisting of a bank of resistors 22, 23, and 24, which are grounded, as shown. The insulated probe 11 and the rotating template 10 are connected in parallel with the resistors 22—24 through the lead line 25 and ground. The voltage developed between the lead line 25 and ground must be sufficient to produce a spark across the air gap between the template 10 and the probe 11. Referring to Fig. 2, it is seen that the signal voltage $a$, at the probe 11 varies as a function of probe position with respect to the template. Thus, when the probe 11 is at a great distance from the template 10, no spark is produced, and an open circuit across resistors 22—24 results. The signal voltage between the probe and ground, therefore, is high. On the other hand, when the probe 11 contacts the template 10, a short circuit is produced across the resistors 22—24, and the voltage between the probe and ground is zero. A null position is defined as a predetermined position intermediate the points where no spark is produced and where a short circuit is created.

The signal voltage $a$ is taken from the resistor 24 by means of a movable tap 26, and is applied to a low pass filter 27 to remove all but the fundamental frequency components and produce a voltage $b$. A source 28 of reference voltage $c$, having a predetermined magnitude, and having a frequency equal to the frequency of voltage $b$, and in phase opposition therewith, is also provided. The voltages $b$ and $c$ are each applied to a summing network 29 wherein the voltages are vectorially added to produce an error voltage $d$ for the input of the amplifier 18.

To define null position, therefore, the tap 26 is varied to produce a voltage $b$ having an amplitude exactly equal to the reference voltage $c$. Since the voltages $b$ and $c$ are 180 degrees out of phase, the summing network 29 will produce a zero error output and the winding 17 will not be energized by the amplifier 18. It is also apparent that the winding 17 will be energized in one phase, or in an opposite phase, depending on the magnitude of the voltage $b$. Thus, when the distance between the probe 11 and the template 10 is greater than said distance at the null position, the magnitude of voltage $b$ will be greater than the magnitude of the reference voltage $c$, and the error voltage $d$ will be of one phase. On the other hand, when the magnitude of voltage $b$ is smaller than the magnitude of the reference voltage $c$, the error voltage $d$ will be of an opposite phase. The magnitude of the error voltage is, of course, dependent on the length of the spark, which is determined by the distance of the probe from the template. The error voltage $d$, therefore, which is amplified and impressed on winding 17 will be zero, or will lead or lag the voltage in winding 16 by 90 degrees. Depending on the phase of the error voltage $d$, the motor 12 will run in a clockwise or counter-clockwise direction to position the rack 13 and maintain the probe 11 in the null position. It is clear that when the probe is in the null position, the motor 12 will not run.

In order to stabilize the system and to eliminate hunting, a tachometer generator 30 is coupled to the motor 12 through the shaft 31, and a negative feedback voltage is fed back to the input circuit of the summing network 29.

Having thus described my invention, it is obvious that many variations and modifications will be readily apparent to those skilled in the art. It is the intent, therefore, that this invention shall be limited only by the prior art, and by the spirit and scope of the appended claims.

What is claimed is:

1. A system for automatically maintaining an insulated probe in predetermined spatial relationship with respect to a rotating template to maintain a gap therebetween, comprising reversible two phase electric motor means coupled to said probe for moving the probe towards or away from said rotating template, means for producing a signal voltage the magnitude of which is proportional to the size of said gap, said last-named means comprising a source of substantially constant alternating voltage in series with an impedance connected across said template and said probe for producing a spark across the gap therebetween and a voltage divider connected across said gap, a reference voltage source for producing a reference voltage having a magnitude equal to said signal voltage when the probe is in said predetermined spatial relationship with respect to the template, and in phase opposition, therewith, summing network means for vectorially adding said signal voltage and said reference voltage to produce an error voltage, and means applying said error voltage to said reversible motor to control the direction and speed of rotation of said motor.

2. The system of claim 1 including low pass filter means electrically disposed between the signal voltage means and the summing network, output of the filter being equal in frequency to the reference voltage, the voltage divider including a variable impedance device to permit adjustment of voltage output of the filter of amplitude equal to the reference voltage in predetermined null position of the probe with respect to the template, the summing network means thereby producing zero error output in said null position thereby producing actuation of the motor only in the presence of a deviation from null position and attendant present error voltage.

3. The system of claim 2 including antihunt and stabilizing means comprising a tachometer generator coupled to the motor and feedback means to provide negative feedback to the summing network from the generator.

References Cited in the file of this patent

UNITED STATES PATENTS

| | | |
|---|---|---|
| 2,026,297 | Bell | Dec. 31, 1935 |
| 2,115,086 | Riggs | Apr. 26, 1938 |
| 2,364,645 | Mott et al. | Dec. 12, 1944 |